Nov. 26, 1963  R. A. BUB  3,112,264
ACCORDION FOLDED FILTER ELEMENT
Filed Sept. 19, 1961  2 Sheets-Sheet 1
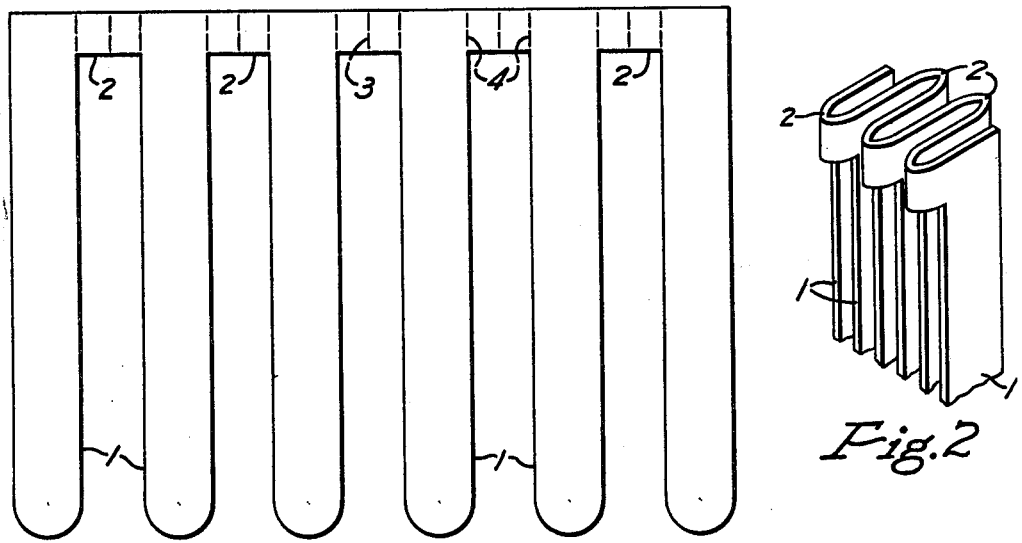
Fig.1
Fig.2
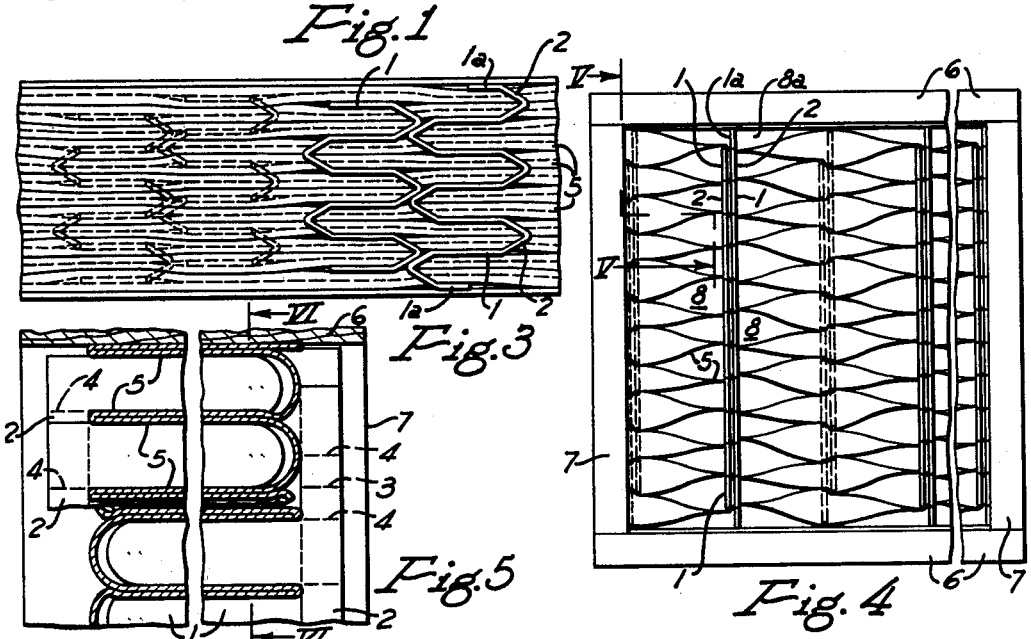
Fig.3
Fig.5
Fig.4
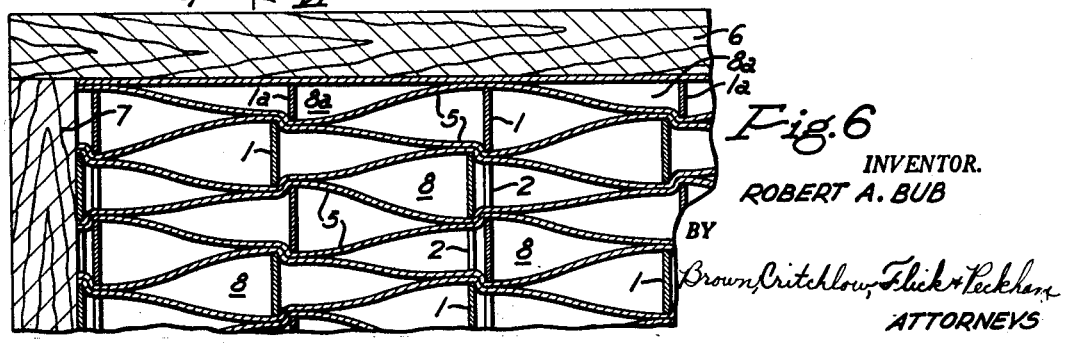
Fig.6
INVENTOR.
ROBERT A. BUB
BY
Brown, Critchlow, Flick & Peckham
ATTORNEYS Nov. 26, 1963 R. A. BUB 3,112,264
ACCORDION FOLDED FILTER ELEMENT
Filed Sept. 19, 1961 2 Sheets-Sheet 2
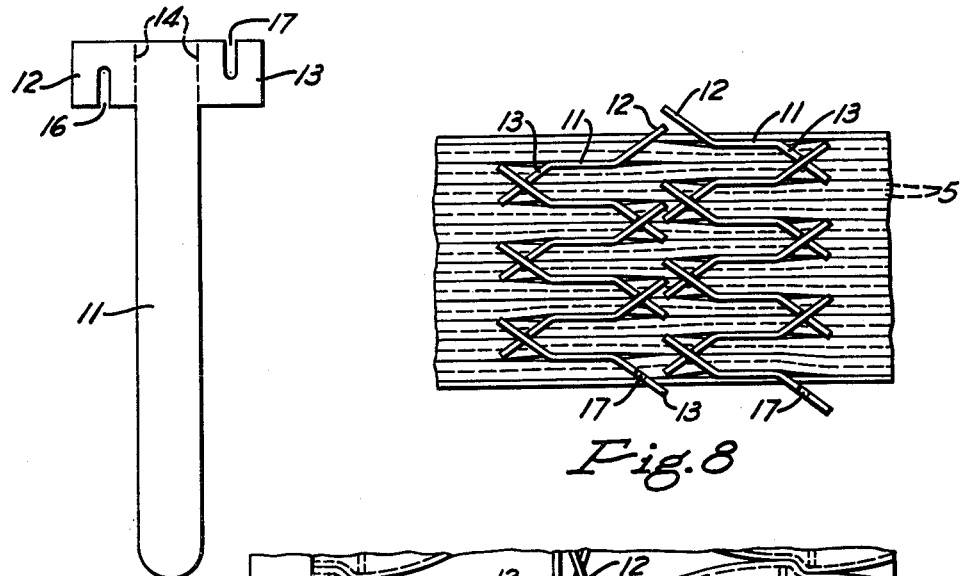
Fig.7
Fig.8
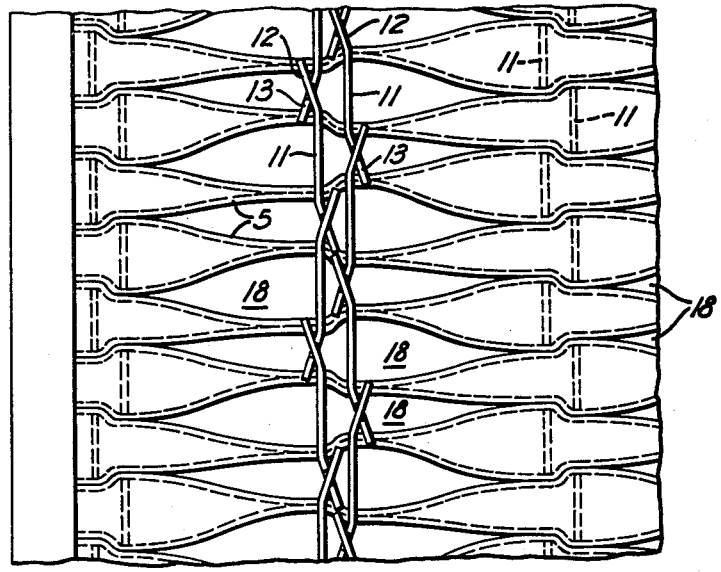
Fig.9
INVENTOR.
ROBERT A. BUB
BY
Brown, Critchlow, Flick + Peckham
ATTORNEYS United States Patent Office 3,112,264
Patented Nov. 26, 1963

3,112,264
ACCORDION FOLDED FILTER ELEMENT
Robert A. Bub, Penn Hills, Pa., assignor to Mine Safety Appliances Company, Pittsburgh, Pa., a corporation of Pennsylvania
Filed Sept. 19, 1961, Ser. No. 139,142
3 Claims. (Cl. 210—493)

This invention relates to filters, and more particularly to those in which a strip of filtering material is accordion folded and provided with laterally spaced pockets.

In my copending patent application Serial Number 33,737, filed June 3, 1960, a filter of the type disclosed herein is shown. In that filter a zigzag strip of filtering material has clamping and spacing devices inserted between the filter sheets in such a manner as to spread certain portions of them apart and clamp other portions together to form a filter provided with a large number of pockets or cells. In that filter the filter sheet clamping and spacing devices can be inserted between the sheets only after the accordion folded element has been expanded. That is because the tongues of those devices project from stiff backing strips which hold the tongues in line. It has been found desirable to be able to insert the sheet clamping and spacing devices in the accordion folded filter element before it is expanded, which is easier to do and which permits the filter element to be shipped in its unexpanded form but with the clamping and spacing devices in place.

Accordingly, it is among the objects of this invention to provide filter sheet clamping and spacing devices that can be inserted between the sheets in a pile of such sheets formed by accordion folding a long strip of filtering material, and which will be automatically moved into operative position when the filter element is expanded.

In accordance with this invention a plurality of stacks of stiff flat tongues are disposed between and parallel to filter sheets arranged in a pile and formed from an accordion folded filter strip. The tongues in each stack are spaced apart by means flexibly connecting their outer ends and extending across the strip folds that connect the sheets. Each of the connecting means extends across two of those folds and has substantially the same width as a tongue. The stacks of tongues are arranged in laterally spaced pairs, with the tongues of one stack inserted between the folds straddled by the folds in another stack of the same pair. The laterally spaced pairs of stacks are inserted between the sheets alternately from opposite sides of the pile. When the pile is expanded, it pulls and swings the tongues in each stack around into line with one another so that they will be disposed in planes substantially perpendicular to the adjoining portions of the sheets. Adjacent rows of tongues are then moved sideways toward each other to clamp filter sheets between them.

The invention is illustrated in the accompanying drawings in which

FIG. 1 is a side view of one of the filter sheet clamping and spacing device blanks;

FIG. 2 is a fragmentary perspective view of the device partly folded;

FIG. 3 is a face view of a filter element before expansion, containing the folded clamping and spacing devices;

FIG. 4 is a face view of the complete filter;

FIG. 5 is an enlarged fragmentary vertical section taken on the line V—V of FIG. 4;

FIG. 6 is a fragmentary vertical section taken on the line VI—VI of FIG. 5;

FIG. 7 is a side view of one of the elements of a modified clamping and spacing device;

FIG. 8 is a fragmentary face view of a filter element containing the modified clamping and spacing devices; and FIG. 9 is a fragmentary face view of the expanded filter element of FIG. 8.

Referring to FIG. 1 of the drawings, a flat blank is formed from a strip of cardboard, aluminum foil or similar inexpensive and relatively stiff material that can be bent readily. The strip is cut to give it a comb-like appearance, in which there are parallel tongues 1 that are spaced apart a distance substantially equal to their width. The tongues are rounded at one end, referred to herein as the inner end. The opposite or outer ends of the tongues are spaced apart by narrow strips 2 integral with them and connecting them together. The strips are made flexible by providing them with fold lines, which may be formed by scoring or the like. Each strip has a fold line 3 across its center and at each end 4 where it joins the tongues.

A long strip of suitable filtering material, such as filter cloth, is accordion folded in a well-known manner to form a pile of integrally connected filter sheets 5, such as in FIG. 3. Before the sheets are ready for use, the top and bottom sheets must be secured to one side of top and bottom frame panels 6, which are then spread apart and held that way by side panels 7. The frame thus formed is much taller than the original pile of sheets, so the pile is expanded and the sheets become spaced apart in zigzag relation. If the sheets were left unsupported between their edges, they would sag and also they would be drawn or forced together in pairs by the fluid passing through them in use. Therefore, it is desirable to fasten adjoining sheets together along laterally spaced lines extending lengthwise of the filter strip, with the lines in each row of lines across a sheet located about midway between the lines in the rows directly above and below them to provide a large number of open-end pockets, the walls of which are held apart. In accordance with this invention, a number of the clamping and spacing devices shown in FIG. 1 are used for this purpose.

Thus, as shown in FIGS. 4, 5 and 6, the tongues of several of the clamping and spacing devices extend from each side of the filter into the spaces between the folds in the filter element, with each flexible strip 2 extending across two folds. The rows of tongues are arranged close together in pairs, with the tongue in one row of each pair disposed between the folds straddled by the other row of tongues in the same pair. The rows of tongues that are inserted from one face or side of the filter are located about halfway between the rows inserted from the opposite side. The tongues separate the filter sheets 6 that they extend between, but the two sheets at each side of a tongue are pressed or clamped together between that tongue and the adjacent edges of two tongues in the adjoining row. The result is that the filter is provided with pockets 8 that open from both of its sides as shown in FIG. 5. A tongue holds every pocket open, but since the tongues in one row are staggered relative to those in the row beside it, the end tongues 1a in some of the rows are made only half as wide as the rest of the tongues because the corresponding pockets 8a are only half as high as most of them, as shown in FIG. 6.

It is a feature of this invention that the clamping and spacing devices are not inserted in the filter element after it has been expanded in the frame as shown in FIG. 4, but are inserted in the pile of filter sheets shown in FIG. 3. To permit this to be done, each device is folded back and forth on the central fold lines 3 of the connecting strips so that the flat tongues are stacked one above or beside another as shown in FIG. 2. The connected outer ends of the tongues then can be held in the hand and the tongues be inserted flat between the substantially parallel filter sheets in the pile. Or, the tongues can be inserted mechanically. As mentioned before, they are inserted between alternate pairs of sheets so that each flexible connecting strip 2 extends across two folds in the filter element. As the tongues are inserted, the connecting strips also bend at fold lines 4. A second folded spacing and clamping device then is inserted beside the first one, but with the tongues disposed between the folds that are straddled by the other device.

After all of the spacing and clamping devices have been inserted in the pile of sheets in this manner in laterally spaced pairs, the accordion folded filter element is fastened to frame panels 6 and expanded, which stretches out each clamping and spacing device and thereby causes the connecting strips 2 to pull into a more or less straight line and the tongues 1 to swing around into the same generally vertical plane. Since the two rows of tongues in each pair of rows will be spaced some distance apart at this time, the two rows then are pushed sideways as close together as possible into the positions shown in FIGS. 4 and 6 to clamp the sheets 6 together in pairs.

These combination clamping and spacing devices can be made of cheap light-weight material by merely stamping them out of continuous strip. The different blanks can then be packed and shipped flat, because the connecting strips between their tongues do not need to be folded until ready for use. If the blank happens to be too long for the filter in which it is to be used, the excess length can simply be torn off at one of the connecting strips.

In the modification shown in FIGS. 7, 8 and 9, each filter sheet clamping and spacing device is formed from a plurality of separate identical T-shape elements. One of these elements is shown in FIG. 7, where it will be seen that it consists of a tongue 11, from the outer end of which integral tabs 12 and 13 project in opposite directions. At their junction with the tongue there may be fold lines 14. Each tab is provided with a deep notch parallel to the tongue, one notch 16 extending into tab 12 from its inner edge and the other notch 17 extending into the other tab from its outer edge. Any number of these elements can be connected together side-by-side by interlocking a notch 16 in one of them with the notch 17 in the element beside it, whereby the adjoining tabs 12 and 13 will intersect each other and overlap. A line of these elements will then form a row of tongues similar in appearance to those shown in FIG. 1. The tongues are actually placed on top of one another as they are hooked together, and the stack of tongues thus formed then is inserted in a pile of filter sheets 6, as shown in FIG. 8, in the same manner that the clamping and spacing devices are inserted in the pile shown in FIG. 3. If desired, the tongues can be hooked together as they are inserted in the filter pile. Since the tongues in each row will be substantially parallel, the intersecting tabs will bend at fold lines 14. When the pile of sheets is expanded by frame panels (not shown) connected to the end sheets, it will pull on each row of tongues and swing them around into substantially a common plane, as shown in FIG. 9. After the filter element has been expanded in this way, with pockets 18 formed by the tongues and the filter sheets clamped between the edges of tongues in adjoining rows, side frame panels are inserted to complete the frame.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a pile of substantially engaging filter sheets formed from an accordion folded filter strip, of a plurality of stacks of stiff flat tongues disposed between said sheets parallel thereto, the tongues in each stack being spaced apart by means flexibly connecting the side edges of their outer ends and extending across the strip folds connecting said sheets, each of said connecting means extending across two of said folds and having substantially the same width as a tongue, said stacks being arranged in laterally spaced pairs with the tongues of one stack inserted between the folds straddled by the other stack in the same pair, and said laterally spaced pairs of stacks being inserted between the sheets alternately from opposite sides of said pile, whereby when said pile of sheets is expanded the spreading sheets will pull the tongues in each stack farther apart until the tongues are restrained by said connecting means and turned thereby substantially into a common plane.

2. In the combination recited in claim 1, said flexible connecting means being folded strips integral with said side edges of the tongues.

3. In the combination recited in claim 1, said flexible connecting means comprising ears projecting from the opposite edges of the tongues, the ears of adjacent tongues being provided with cooperating notches flexibly interlocking the ears.

References Cited in the file of this patent

UNITED STATES PATENTS

| | | |
|---|---|---|
| 1,083,694 | Myles | Jan. 6, 1914 |
| 2,455,291 | Benoit | Nov. 30, 1948 |
| 2,685,366 | Jenner | Aug. 3, 1954 |
| 2,988,227 | Harms | June 13, 1961 |